Figure 1:
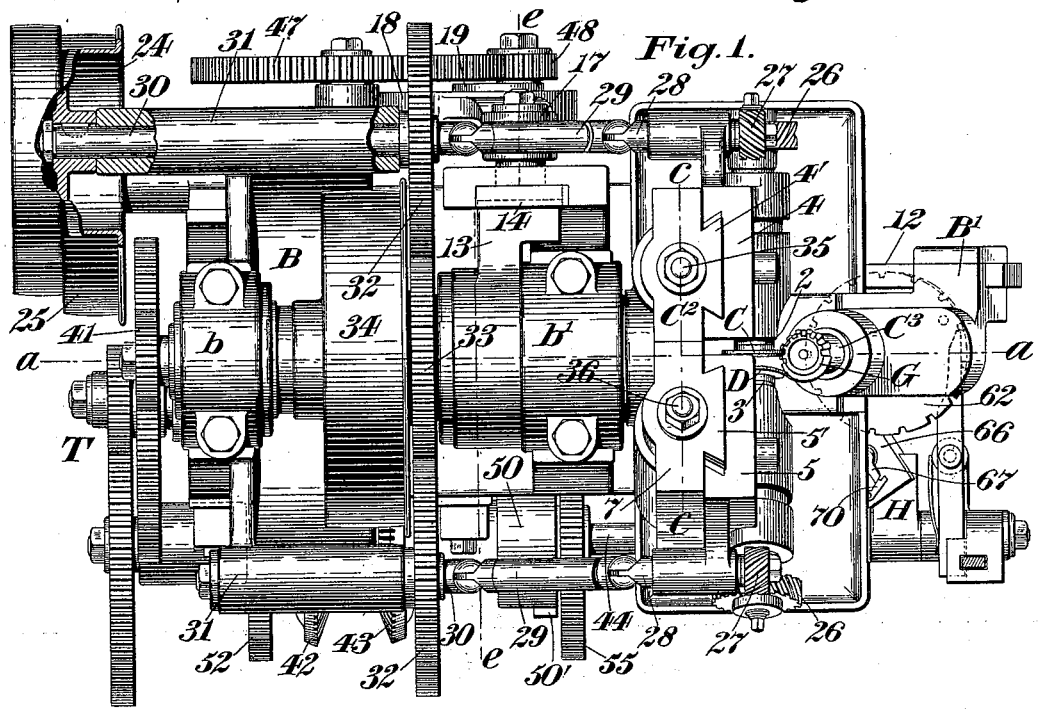

(No Model.) 9 Sheets—Sheet 1.

H. C. WARREN.
MACHINE FOR GENERATING GEAR TEETH.

No. 588,738. Patented Aug. 24, 1897.

Witnesses:
J. L. Edwards Jr.
Fred. J. Dole.

Inventor:
Herbert C. Warren.
By his Attorney,
F. H. Richards.

THE NORRIS PETERS CO., PHOTO-LITHO., WASHINGTON, D. C.

(No Model.) 9 Sheets—Sheet 2.

H. C. WARREN.
MACHINE FOR GENERATING GEAR TEETH.

No. 588,738. Patented Aug. 24, 1897.

Witnesses:
O. W. Smith
Fred. J. Dole.

Inventor;
Herbert C. Warren.
By his Attorney,
F. H. Richards.

(No Model.) 9 Sheets—Sheet 3.
H. C. WARREN.
MACHINE FOR GENERATING GEAR TEETH.
No. 588,738. Patented Aug. 24, 1897.
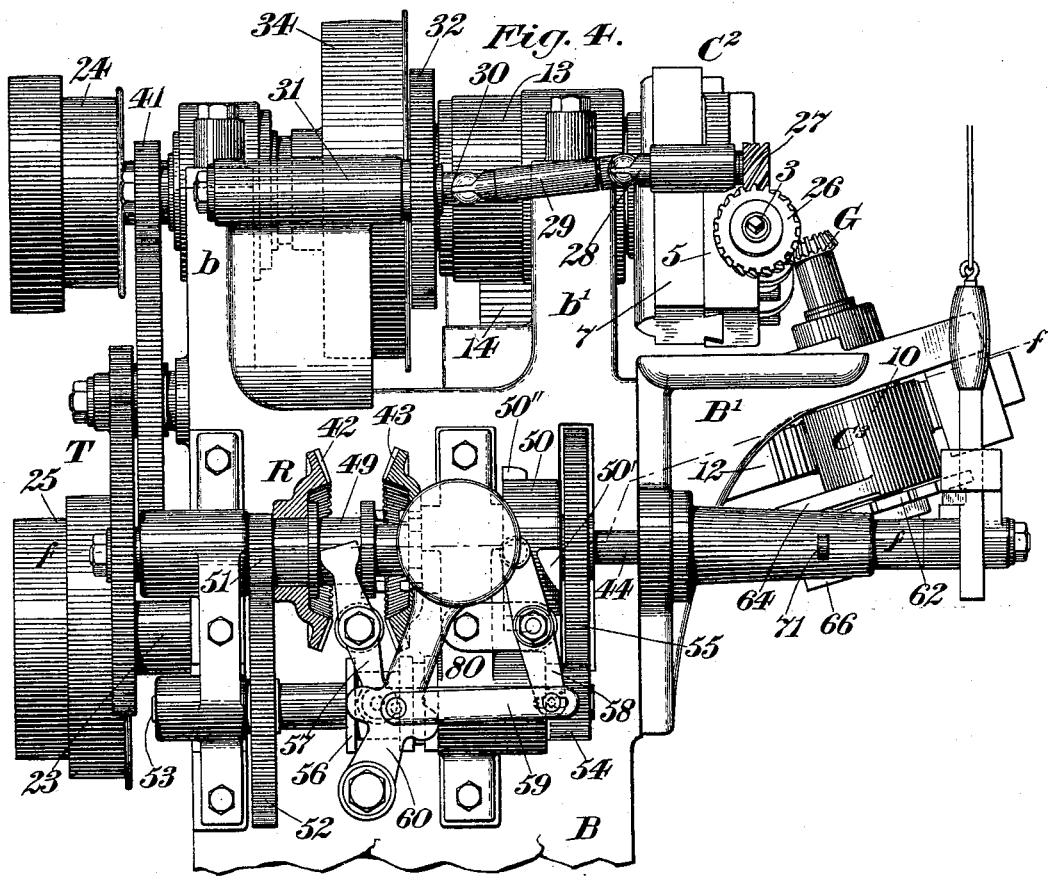
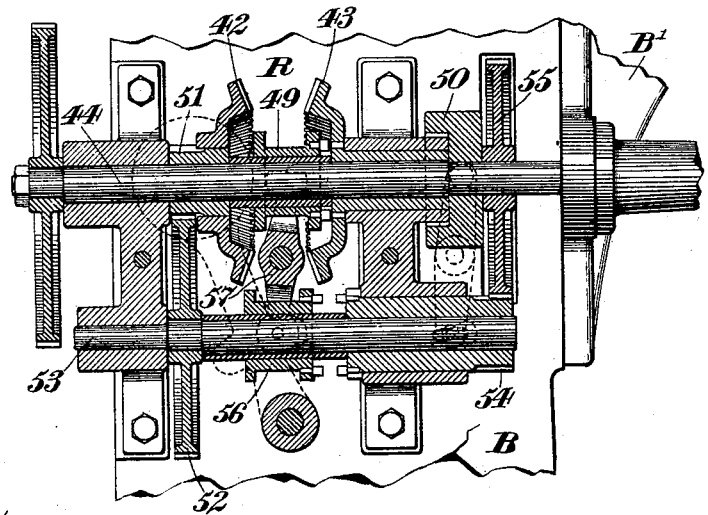
Witnesses:
O. W. Smith
Fred. J. Dole.
Inventor:
Herbert C. Warren
By his Attorney,
F. A. Richards (No Model.)  9 Sheets—Sheet 4.

H. C. WARREN.
MACHINE FOR GENERATING GEAR TEETH.

No. 588,738.  Patented Aug. 24, 1897.

Witnesses:
J. L. Edwards Jr.
Fred. J. Dole.

Inventor:
Herbert C. Warren.
By his Attorney,
F. A. Richards.

THE NORRIS PETERS CO., PHOTO-LITHO., WASHINGTON, D. C.

(No Model.) 9 Sheets—Sheet 5.
H. C. WARREN.
MACHINE FOR GENERATING GEAR TEETH.
No. 588,738. Patented Aug. 24, 1897.
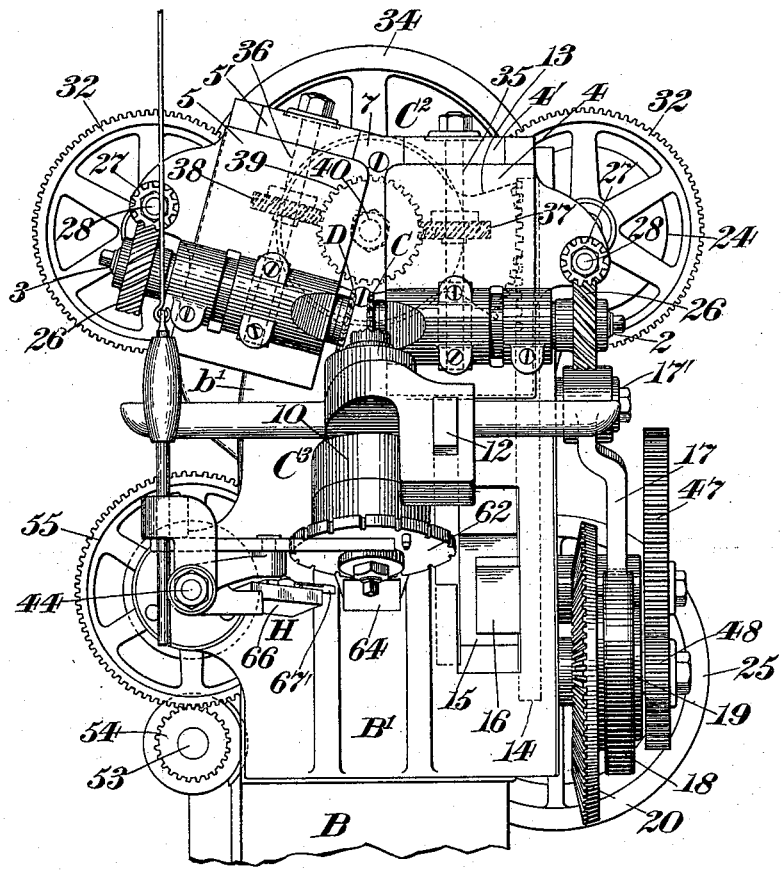
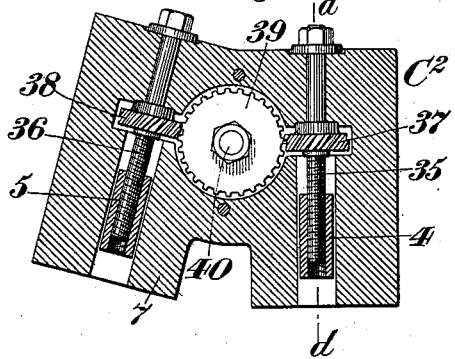
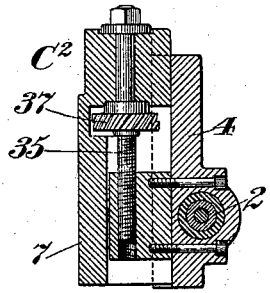
Witnesses:
O. W. Smith
Fred. J. Dole.
Inventor:
Herbert C. Warren.
By his Attorney,
F. A. Richards.
THE NORRIS PETERS CO., PHOTO-LITHO., WASHINGTON, D. C.

(No Model.) 9 Sheets—Sheet 6.
H. C. WARREN.
MACHINE FOR GENERATING GEAR TEETH.
No. 588,738. Patented Aug. 24, 1897.
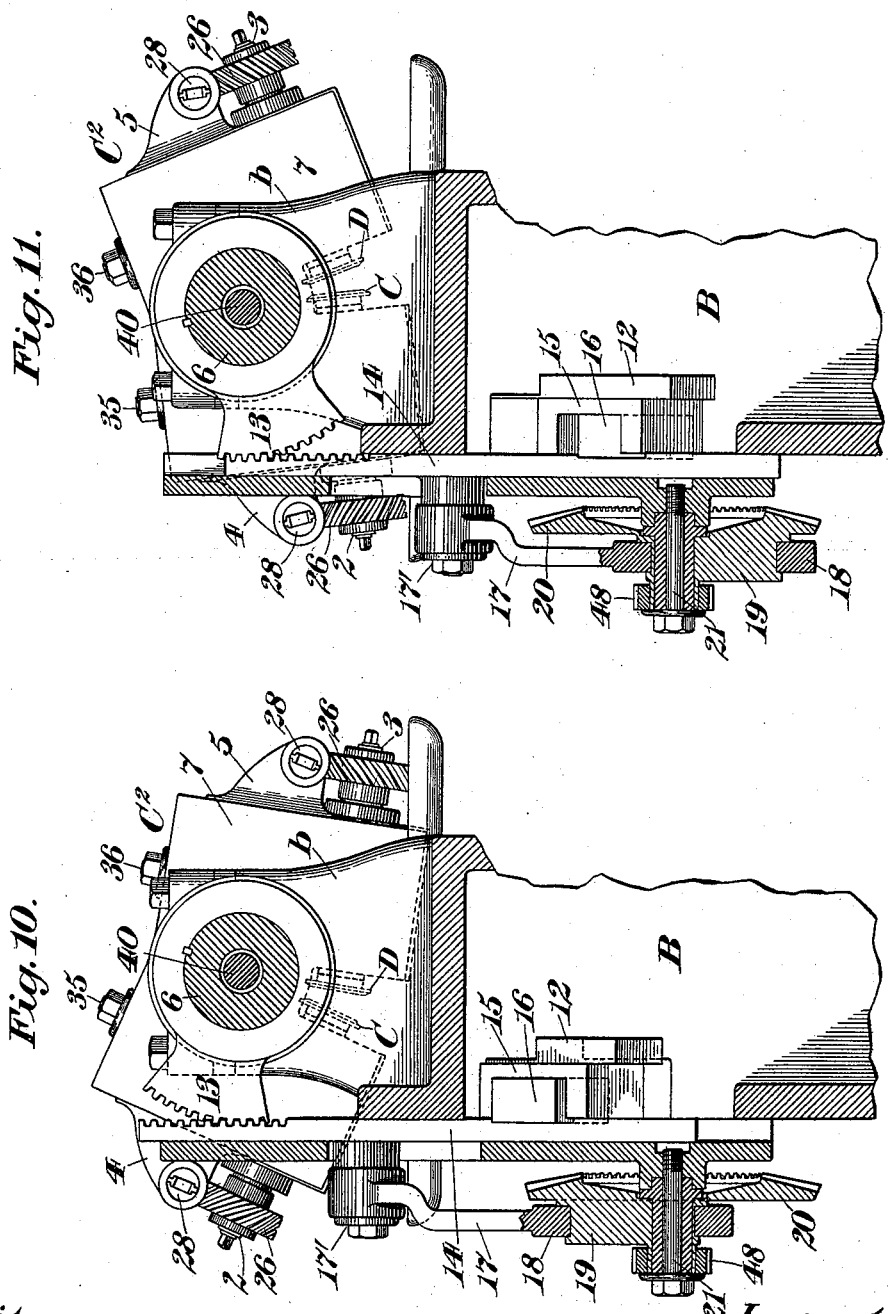
Witnesses:
O. W. Smith
Fred. J. Dole.
Inventor:
Herbert C. Warren,
By his Attorney
F. A. Richards.

(No Model.) 9 Sheets—Sheet 7.
H. C. WARREN.
MACHINE FOR GENERATING GEAR TEETH.
No. 588,738. Patented Aug. 24, 1897.
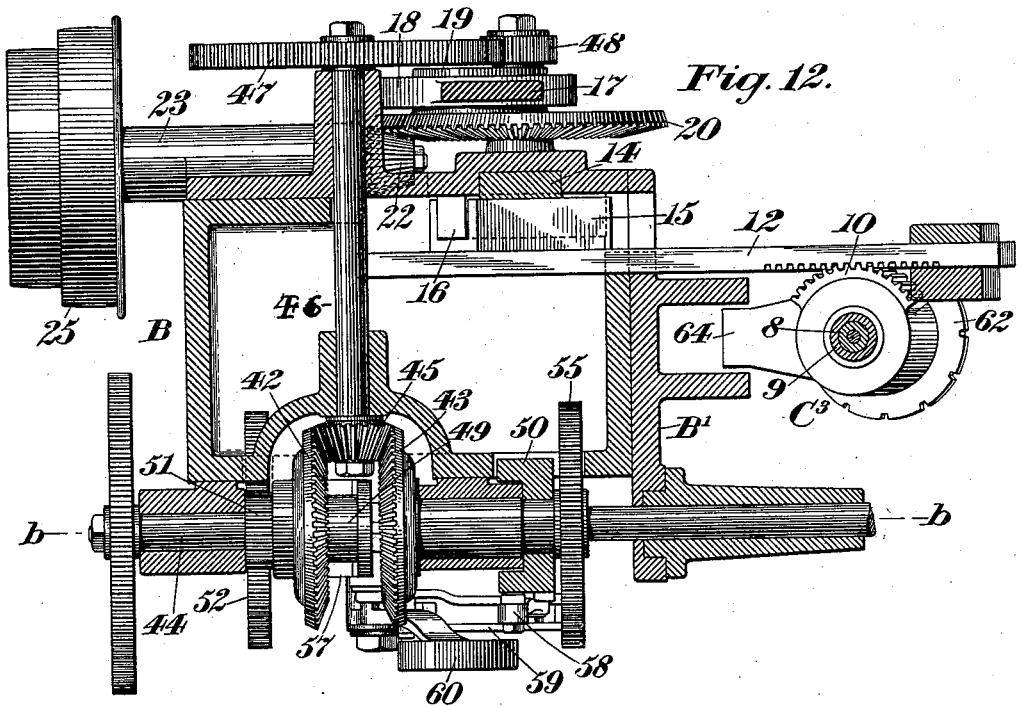
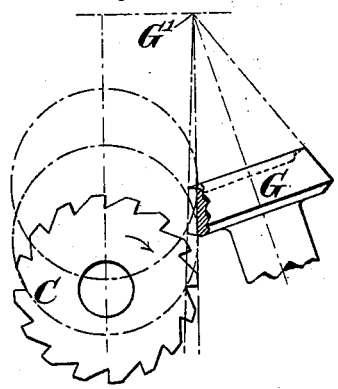
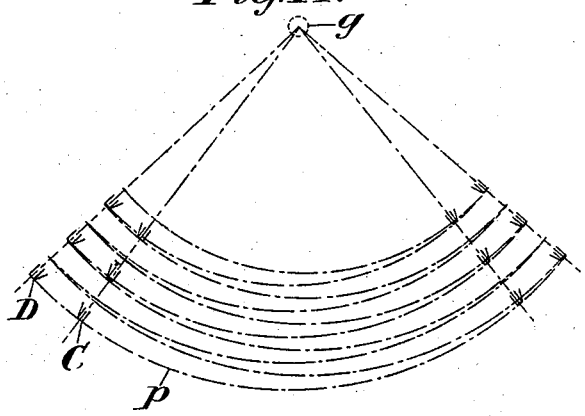
Witnesses:
O. W. Smith
Fred. J. Dole.
Inventor:
Herbert C. Warren,
By his Attorney
F. A. Richards.

(No Model.) 9 Sheets—Sheet 8.
H. C. WARREN.
MACHINE FOR GENERATING GEAR TEETH.
No. 588,738. Patented Aug. 24, 1897.
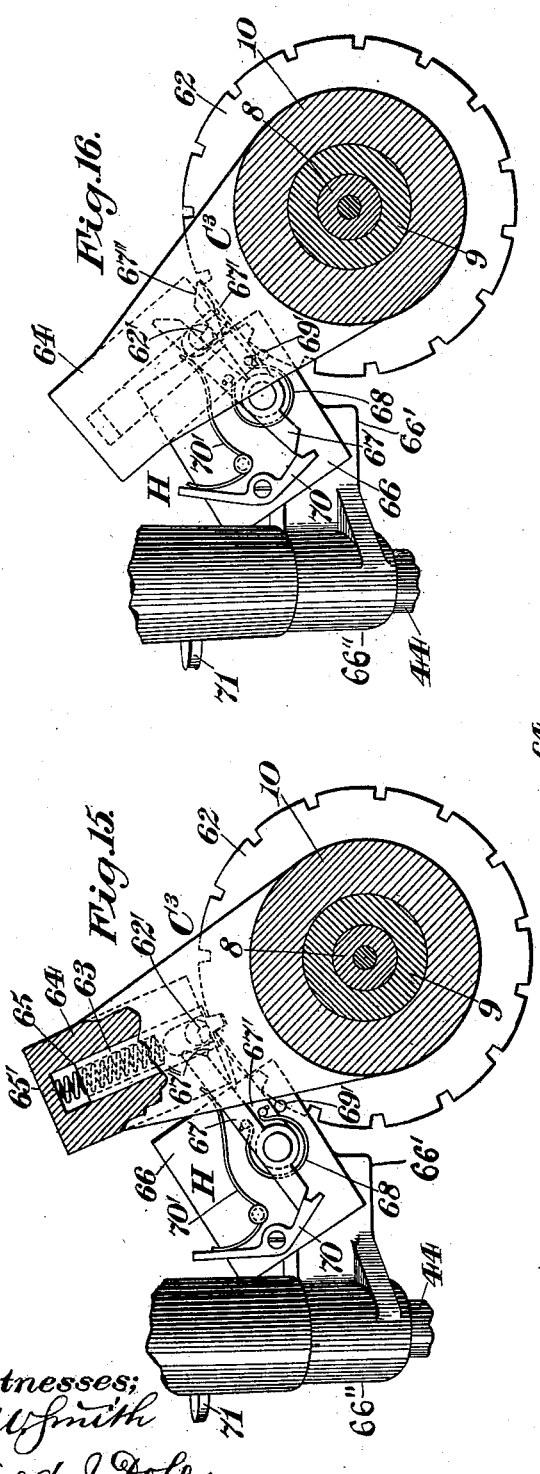
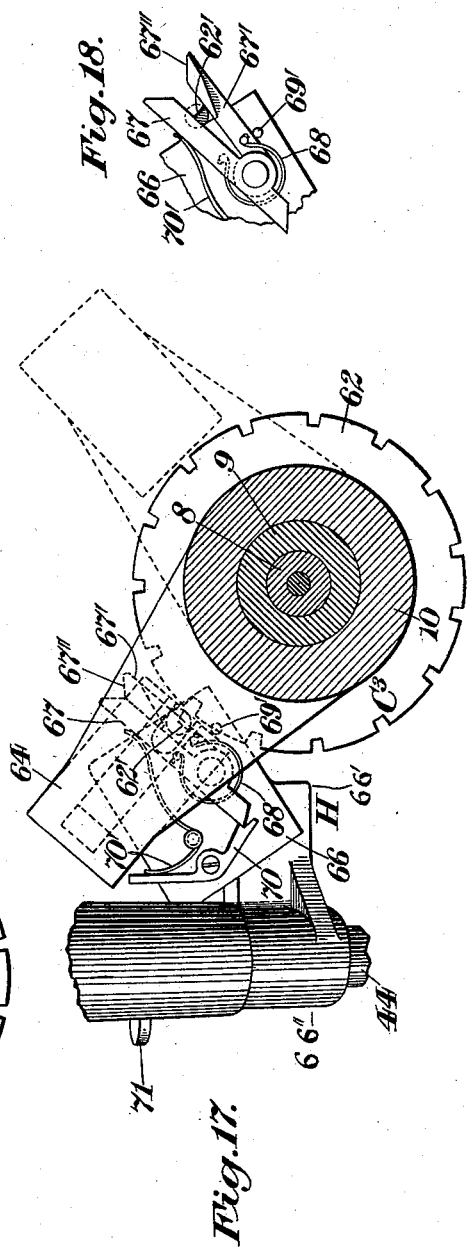
Witnesses:
O. W. Smith
Fred. J. Dole.
Inventor:
Herbert C. Warren
By his Attorney
F. A. Richards.

(No Model.) 9 Sheets—Sheet 9.

H. C. WARREN.
MACHINE FOR GENERATING GEAR TEETH.

No. 588,738. Patented Aug. 24, 1897.

Witnesses:
O. W. Smith
Fred J. Dole

Inventor;
Herbert C. Warren
By his Attorney
F. H. Richards

UNITED STATES PATENT OFFICE.

HERBERT C. WARREN, OF HARTFORD, CONNECTICUT.

MACHINE FOR GENERATING GEAR-TEETH.

SPECIFICATION forming part of Letters Patent No. 588,738, dated August 24, 1897.

Application filed November 20, 1896. Serial No. 612,894. (No model.)

*To all whom it may concern:*

Be it known that I, HERBERT C. WARREN, a citizen of the United States, residing in Hartford, in the county of Hartford and State of Connecticut, have invented certain new and useful Improvements in Machines for Generating Gear-Teeth, of which the following is a specification.

This invention relates to machines for generating gear-teeth.

The object of my present invention is to furnish a machine of the class specified embodying improved mechanism whereby theoretically correct gear-teeth, and more especially radial gear-teeth, may be generated with rapidity and economy and whereby the entire series of operations necessary to the generation of the successive teeth of an entire circuit of teeth may be automatically effected.
To this end my improved machine for generating gear-teeth embodies a rotary reciprocatory gear-blank carrier, an oscillatory cutter-carrier, actuating mechanism embodying means for simultaneously imparting a rotary reciprocatory movement to the gear-blank carrier and an oscillatory movement to the cutter-carrier of predetermined relative velocities, feed mechanism for imparting a relatively slow advancing movement to the cutter-carrier in a plane intersecting the oscillatory path thereof and embodying means for automatically effecting a relatively rapid retractive movement to said cutter-carrier, and means controlled by the movements of the cutter-carrier for intermittently advancing the gear-blank carrier a predetermined arc distance between intermittent advancing movements of said cutter-carrier.

Figure 2:
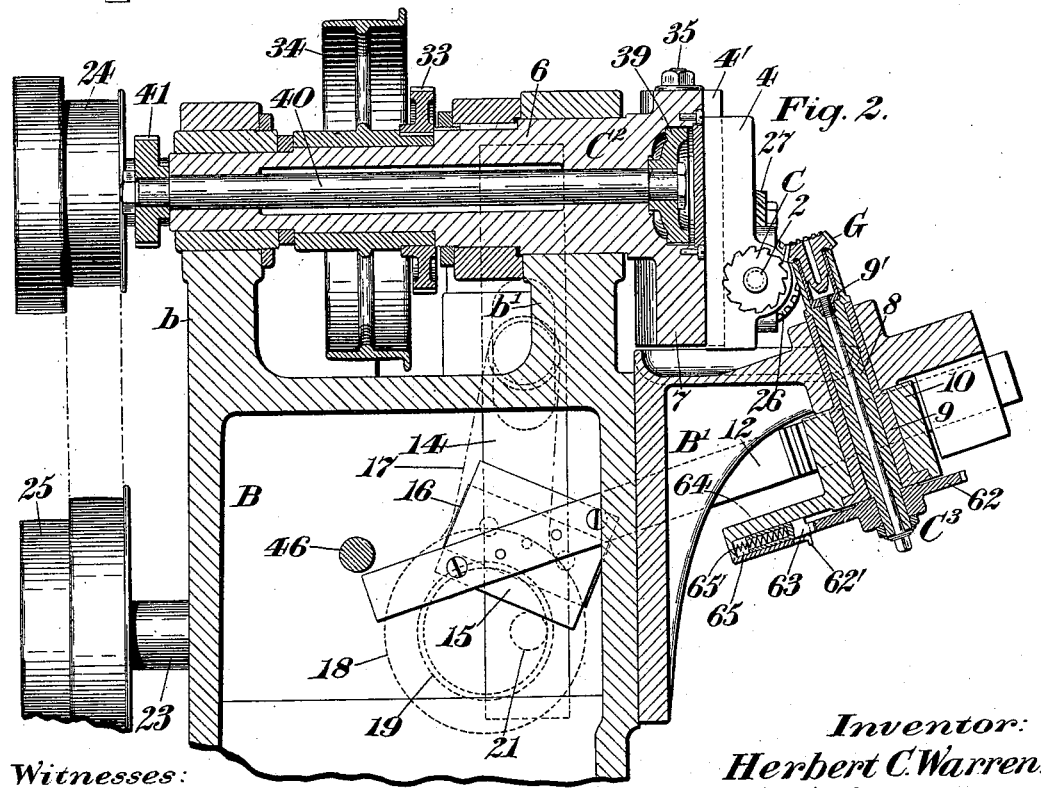
Figure 3:
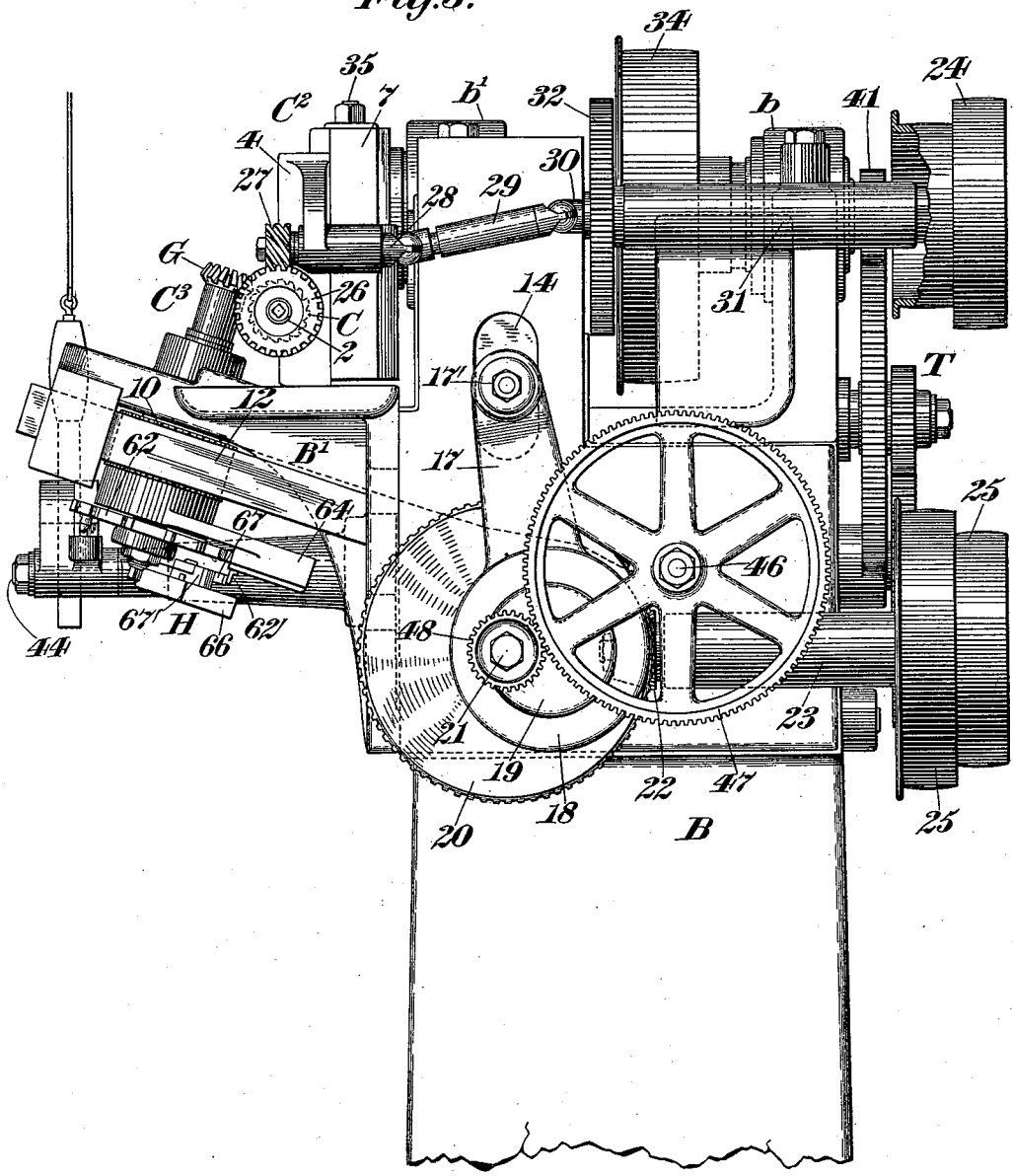
Figure 6:
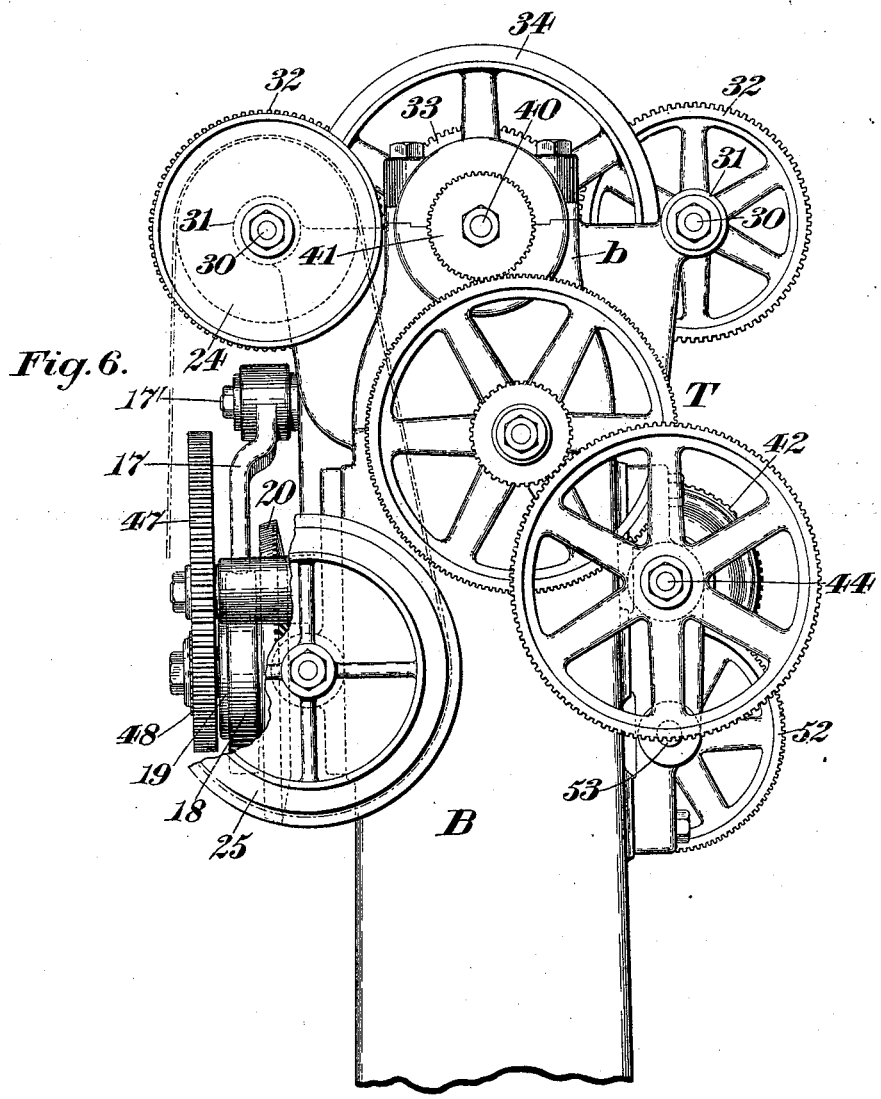
Figure 19:
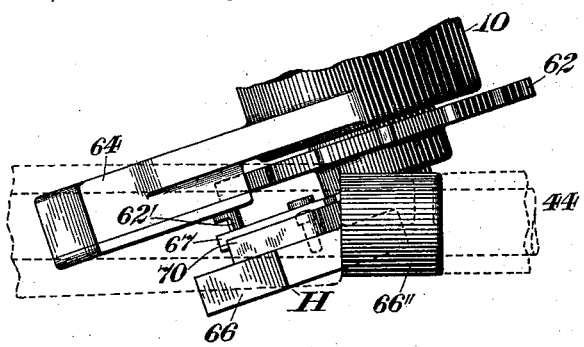
Figure 20:
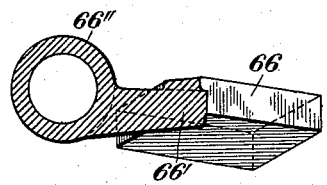
Figure 21:
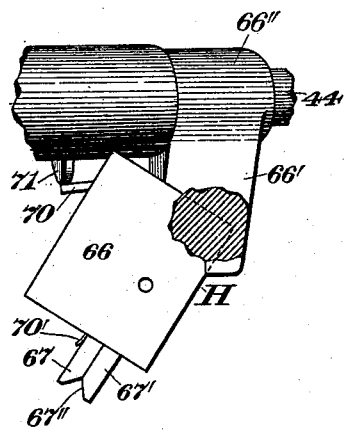

In the drawings accompanying and forming part of this specification, Figure 1 is a plan view, partially in section, of a machine embodying my present improvements. Fig. 2 is a vertical longitudinal section of a portion of the gear-generating machine, taken on the line corresponding with the dotted line *a a*, Fig. 1, looking up in said figure and showing the cutter in its extreme retracted position or in the position it occupies just preparatory to the beginning of the working stroke thereof, a gear-blank being shown in position to be operated upon by said cutter. Fig. 3 is a side elevation of the machine as seen from the right in Fig. 7. Fig. 4 is a side elevation of the machine as seen from the left in Fig. 7, said figure showing the parts of the feed-reversing mechanism in the position of imparting a relatively slow feed movement to the cutter-carrier. Fig. 5 is a longitudinal sectional view of the feed-reversing and index-controlling mechanism, taken in a line corresponding to the dotted line *b b*, Fig. 12, and showing the parts of the feed mechanism in position to impart a relatively rapid return movement to the cutter-carrier, parts of the clutch-shifting device being shown in dotted lines. Fig. 6 is a rear end elevation of a portion of the machine as seen from the left in Fig. 1, parts thereof being broken away. Fig. 7 is a front end elevation of the machine as seen from the right in Fig. 1. Fig. 8 is a vertical central section of the cutter-slide carrier, taken in a line corresponding with the dotted line *c c*, Fig. 1, looking toward the front of said carrier and showing portions of the cutter-slides and the feed-wheel and feed-screws in connection therewith. Fig. 9 is a vertical cross-section of the cutter-slide carrier and cutter-slide, taken on the line corresponding with the dotted line *d d*, Fig. 8. Figs. 10 and 11 are vertical cross-sectional views of a portion of the machine, taken on the line corresponding with the dotted line *e e*, Fig. 1, looking toward the right in said figure and showing, respectively, the cutter-slide carrier and oscillating mechanism therefor in two extreme positions. Fig. 12 is a horizontal cross-section of a portion of the machine, taken on a line corresponding with the dotted line *f f*, Fig. 4, and showing a portion of the actuating mechanism for the blank-carrier and cutter-carrier, and also showing a portion of the feed mechanism. Fig. 13 is a side view of a portion of a gear-blank and a cutter in operative relation therewith and shows in full and dotted lines several successive positions of the cutter during the progressive cutting movement thereof. Fig. 14 is a diagrammatic view illustrating the sinuous path described by the cutters in generating a toothed face. Figs. 15, 16, and 17 are sectional details of the gear-blank-carrier indexing mechanism, showing, respectively, three successive positions of those parts which are instrumental in effecting an indexing movement of the gear-blank carrier, Fig. 15 showing the index-pin actuator in position to engage and release the index-pin from engagement with the index-wheel, Fig. 16 showing such index-pin released from engagement with the index-wheel by means of the pin-actuator through the continued advancing movement of the pin-carrier, and Fig. 17 showing the pin reëngaged with the next adjacent index-notch of the index-wheel and the latch members of the pin-actuator in a locked inoperative position. Fig. 18 is a detail of a portion of the index-pin actuator, showing the two latch members in the position thereof shown in dotted lines in Fig. 16. Fig. 19 is an enlarged side view similar to Fig. 4 of a portion of the index mechanism, showing the index-pin actuator, the index-pin carrier, and the index-wheel of said mechanism in the positions they occupy relatively to one another just preparatory to the engagement of the latch members of the carrier with the index-pin, these positions of said parts corresponding to the positions of like parts as illustrated in Fig. 15, certain other elements of the mechanism being shown in dotted lines. Fig. 20 is an end view, partially in section, of the carrier-plate of the index-pin actuator illustrated in Fig. 19; and Fig. 21 is a plan view of a portion of the shaft that carries the index-pin actuator and shows said actuator in its retracted position or in a position just opposite that shown in Fig. 15.

Similar characters designate like parts in all the figures of the drawings.

Briefly stated, the improved apparatus for generating gear-teeth preferably embodies an oscillatory cutter-carrier, an oscillatory gear-blank carrier, actuating mechanism in connection with and effective for imparting oscillatory movements of predetermined relative velocities to the cutter-carrier and gear-blank carrier in synchronism, feed mechanism in connection with and effective for imparting a slow working stroke and a relatively rapid return stroke alternately to the cutter-carrier in a plane intersecting its oscillatory path of movement, and means controlled by the cutter-carrier feed mechanism for advancing the gear-blank carrier a predetermined arc distance between successive working strokes of the cutter-carrier, whereby the working and return strokes of said cutter-carrier and the indexing of the gear-blank are effected automatically and in their proper order.

The actuating mechanism as an entirety for the cutter-carrier and gear-blank carrier includes the following elements or mechanisms, to wit: a cutter-carrier oscillating actuator, a blank-carrier oscillating actuator, an actuating-connector between the cutter-carrier actuator and blank-carrier actuator and effective for imparting to said actuators a predetermined ratio of movement, feed mechanism in connection with the cutter-carrier and effective normally for imparting a slow feed stroke to said carrier in a plane intersecting the oscillatory path thereof and embodying a feed-reversing device, including means for imparting a relatively-rapid return stroke to said carrier, and index-actuating instrumentalities controlled by the feed mechanism for advancing the blank-carrier a predetermined arc distance between successive working strokes of the cutter-carrier.

In generating the teeth of bevel-gears, owing to the fact that the spaces between the teeth in bevel-gears are of greatly-reduced width toward the apexes thereof, it is not only desired but is also conducive to theoretical correctness in generating teeth of this class to form one face of the tooth at one time and to employ a cutter which is very thin and adapted for freely passing through the narrowest part of the tooth-spaces. For this purpose and also for the purpose of facilitating the operation of generating a complete circuit or the entire complement of gear-teeth in the gear-blank and obviate the necessity of a repetition of the operation to form opposite faces of the successive teeth it is preferable to employ in connection with the organization of mechanism shown in the drawings two tooth-face-generating cutters set side by side in position for cutting the opposite faces of adjacent teeth, one cutter acting upon and generating one face of one tooth and the other cutter acting upon and generating the opposite face of the next adjacent tooth. It is desired to state in this connection that while I prefer to use two rotary cutters I do not wish to limit this invention to the number, disposition, or form of cutters employed in connection with the associated mechanisms.

The framework of the machine, which may be of any suitable general construction for supporting and carrying the several fixed and operative details of the several mechanisms and parts, is shown comprising the main body portion B, having two uprights or brackets $b$ and $b'$, adapted for supporting the cutter-carrier and also having an outwardly-extending bracket B', adapted for supporting the gear-blank carrier.

In the organization thereof shown in dotted lines in Figs. 10 and 11 of the drawings the cutters, which are designated by C and D, respectively, are rotatably supported side by side and are adapted to have swinging movements substantially in the line of their axes of rotation and preferably in an arc concentric to a common center or a so-called "cone center" of the machine, which common center or cone center is represented by a dotted circle, which is designated by $g$, Fig. 14 of the drawings. It will be understood, however, that instead of employing two cutters set side by side, as above stated, one cutter might be employed, in which case the cutter would obviously act upon and generate the opposing faces of two adjacent teeth—that is, the opposite walls of a tooth-space—as set forth in Letters Patent of the United States No. 547,571, granted to me October 8, 1895, to which reference may be had.

The cutter-carrier, which is designated in a general way by C², and the gear-blank carrier, which is designated in a general way by C³, are shown supported for oscillatory movements about axes located in intersecting planes, the cutter-carrier being supported with its axis in a horizontal plane in bearings on the brackets b and b' of the framework and the gear-blank carrier being supported with its axis in an oblique plane in suitable bearings on the bracket B' of said framework.

The term "cutter-carrier" in the broader sense thereof as employed in certain claims signifies any suitable form of device embodying means for supporting the cutter and for facilitating an oscillatory and a reciprocatory movement of the cutter in relatively intersecting planes, as will be hereinafter more fully described.

The cutter-carrier in the organization of mechanism shown in the accompanying drawings comprises, essentially, three members, one of which is in the nature of a cutter-slide carrier (designated in a general way by C²) supported for oscillatory movement about a horizontal axis, and the others of which are shown as two cutter-slides 4 and 5, respectively, supported on the cutter-slide carrier for reciprocatory movements in planes intersecting the oscillatory path of the carrier member and in planes radial to a common axis.

The cutters, which are herein shown as circular milling-cutters and are designated by C and D, respectively, are supported side by side with their adjacent faces in oblique planes radial to a common center upon the inner ends, respectively, of two cutter-carrying arbors 2 and 3, supported in suitable bearings upon the cutter-slides 4 and 5, respectively, with their axes at right angles to the radial planes of said cutters, respectively.

The cutter-slides 4 and 5 are supported for reciprocatory movement in guideways 4' and 5' on the slide-carrier C², located one at each side of the axis of oscillatory movement of said carrier. This carrier, in the form thereof shown most clearly in Fig. 2 of the drawings, comprises the tubular stem or journal 6, rotatively supported in bearings on the brackets b and b', and the slide-carrying head 7, having the slide-supporting guideways 4' and 5'.

The gear-blank carrier C³ comprises, in the preferred form thereof shown clearly in Fig. 2 of the drawings, an arbor or spindle 8, journaled for rotation in an elongated sleeve-like bearing 9, fixed in the bracket B', with its axis located in a plane intersecting the axis of the cutter-carrier, and which spindle is furnished with a chuck (designated by 9') at that end thereof adjacent to the cutters C and D for holding the gear-blank, which is designated by G. It will be obvious, however, that the gear-blank may be secured in the gear-blank carrier in any suitable manner.

As a convenient means for imparting oscillatory or reciprocatory movements to the cutter-carrier and blank-carrier and also for maintaining a predetermined ratio of velocity between said cutter-carrier and blank-carrier I preferably employ a cutter-carrier actuator in operative connection with the cutter-carrier, a blank-carrier actuator in operative connection with the blank-carrier, and means operatively connecting the two actuators and adapted, through mechanisms hereinafter described, for imparting unitary movements of a predetermined velocity to said two actuators.

The cutter-carrier actuator, in its preferred form thereof shown most clearly in Figs. 7, 10, and 11 of the drawings, comprises a sector or segment-gear 13, which is fixed to the tubular portion or journal 6 of the cutter-carrier, and a vertical reciprocatory rack 14, supported in a slideway in the framework and having its teeth in mesh with the sector 13.

The blank-carrier actuator, in the preferred form thereof shown in the accompanying drawings, comprises a sector or segment-gear 10, journaled upon the sleeve 9, which carries the blank-carrying spindle 8, and a reciprocatory rack 12, supported in slideways in the framework, with its longitudinal axis oblique to and intersecting the longitudinal axis of the rack 14, which actuates the cutter-carrier, and having its teeth in mesh with the teeth of the segment-gear 10.

The actuating-connector between the cutter-carrier actuator and blank-carrier actuator is shown in the drawings as of the "taper-bar" variety, it consisting, preferably, of a taper-bar 15, which is shown most clearly in Figs. 2, 10, and 11 fixed to the rack or blank-carrier-actuating member and having a taper-block-receiving groove, the longitudinal axis of which intersects the longitudinal axis of said rack, and a taper-block 16, fixed to the rack or cutter-carrier-actuating member 14 and shiftably seated in the groove of the taper-bar. This constitutes a convenient connecting means between the two actuating members 14 and 12, which control, respectively, the sidewise movement of the cutter and the oscillatory movement of the gear-blank and also facilitates the establishment of a predetermined ratio of movement between the cutter and gear-blank. It will be understood, however, that any suitable means may be employed for effecting unitary movements of and for establishing different ratios of movement between the cutter-carrier and blank-carrier, as may be required when generating different kinds of teeth. It will also be obvious that the adjustment of the sidewise motions of the cutter and the oscillatory motions of the gear-blank might be micrometrically effected by any well-known or suitable measuring means, one form of means for accomplishing this end being shown and described in connection with the taper-bar in my prior patent hereinbefore referred to. Therefore, as it is within the purview of my invention to employ any means adapted for imparting to the gear-blank carrier and cutter-carrier oscillatory movements in relatively intersecting planes, and, further, to employ any suitable means for establishing a predetermined ratio of movement between said cutter-carrier and gear-blank carrier, it is to be understood that the invention is not limited to the specific mechanism shown in the drawings for accomplishing this purpose.

The means employed for reciprocating the two carrier-actuating members 12 and 14 is shown as a connecting-rod 17, pivoted at its upper end, as shown at 17', to the rack-bar 14 and having an eccentric-strap 18 at the lower end thereof, which encircles an eccentric 19, that forms part of a bevel-gear 20, which is rotatively mounted upon a stud 21, fixed to the framework, and which bevel-gear 20 is rotated through the medium of a relatively small bevel-pinion 22, fixed to a shaft journaled in a bearing 23 on the framework, and which shaft is provided at the outer end thereof with a band-wheel 25, which is driven from a similar band-wheel fixed to one of the shafts which actuates one of the cutters, as will be hereinafter more fully described.

As a convenient means for rotating the cutter-spindles 2 and 3 each spindle is shown furnished at the outer end thereof with a spiral gear 26, which meshes with a relatively small spiral gear 27, fixed to the end of a short shaft 28, journaled in a bearing on the cutter-slide at the outer side thereof, and which shaft is operatively connected by a universal telescopic connector 29 to the shaft 30, journaled in a bearing 31 on the framework of the machine, preferably in horizontal alinement with the axis of oscillation of the cutter-carrier, and which shaft is provided with a spur-wheel 32, which meshes with a similar spur-wheel 33, fixed to the hub of a driving-pulley 34, which driving-pulley is preferably rotatably mounted upon the journal or tubular extension 6 of the cutter-carrier, and which pulley 34 may be driven from any suitable source of power in the usual manner of rotating the driving-pulleys of ordinary machines.

The pulley 24, from which the pulley 25 is driven to rotate the eccentric that controls the movements of the cutter-carrier actuator and blank-carrier actuator, is fixed to the outer end of one of the shafts 30, preferably in vertical alinement with the shaft on which the pulley 25 is mounted.

It will be understood that the actuating elements for the blank-carrier, cutter-carrier, and cutters will be proportioned, organized, and timed to secure the best results in operation.

For the purpose of imparting a relatively slow working stroke to the cutter-slides in a plane intersecting the oscillatory path of movement of said slides and for the purpose of imparting a relatively rapid return movement to said slides I have provided rotative feed mechanism embodying a reversing device in operative connection with said cutter-slide. This feed mechanism, in the preferred form thereof shown most clearly in Figs. 1, 2, 7, 8, and 9 of the drawings, embodies two feed-screws 35 and 36, journaled in the cutter-slide-carrier head 7, one at each side of the axis of oscillatory movement of said carrier and having screw-threaded bearings in the two cutter-slides 4 and 5, respectively, (see Figs. 8 and 9;) two spiral gear-wheels 37 and 38, fixed to the feed-screws 35 and 36 and meshing, respectively, with opposite sides of a spiral feed-wheel 39, fixed to a shaft 40, which shaft is journaled in and extends through the tubular extension 6 of the cutter-carrier, with its axis coincident with the axis of said carrier; a pinion 41, fixed to the opposite end of the shaft 40, and a reversing driving device (designated in a general way by R) operatively connected with the feed-shaft pinion 41 by means of a train of gears, as will be hereinafter more fully described.

The feed mechanism above described is constructed, organized, and timed to impart an intermittent or step-by-step movement to the cutter-slides. In practice it is preferable to advance or impart an effective movement to the cutters during and throughout each alternate oscillatory movement of the carrier and to do this in such manner that during the oscillatory movement of the carrier in one direction or toward the right, as indicated in the diagram Fig. 14, the cutters will have an oscillatory movement in a path concentric to the axis of the carrier, and that during the oscillatory movement of the carrier in a reverse direction or toward the left, as indicated in said diagram, the cutters will have a combined oscillatory and advancing movement, causing the cutting-point of the cutter to describe a curvlinear line that is substantially eccentric to the axis of the carrier. To accomplish this, it is simply necessary to oscillate the carrier and rotate the feed-wheel 39 at coinciding velocities. This will cause the spiral gear-wheels 37 and 38, fixed to the feed-screws 35 and 36, to move with the feed-wheel 39 in an orbital path about the axis of said feed-wheel without rotation on their own axes and without effecting a feed or radial movement of the cutter-slides when the cutter-carrier has an oscillatory movement in a direction corresponding to the direction of rotation of the feed-wheel. On the contrary, when said cutter-carrier has an oscillatory movement in a direction opposite to the direction of rotation of the feed-wheel said spiral-wheels 37 and 38 will have a rotative movement about their own axes, in addition to an orbital movement about the shaft of the feed-wheel, and will, through the medium of the feed-screws, impart a feed movement to the cutter-slides.

From the foregoing it will be understood that the feed-wheel 39 is, during the cutting operation of the cutters, rotated constantly in one direction and that the spiral feed-wheels 37 and 38 are only rotated to impart feed movements to the cutter-slides during the oscillatory movement of the cutter-carrier in a direction opposite to the direction of rotation of the feed-wheel and will therefore only impart feed movements to the cutter-slides at and throughout each alternate oscillatory stroke of the cutter-carrier.

In practice the construction, organization, and timing of the cutter-carrier oscillating mechanism and cutter-slide feed mechanism will be such as to impart to the cutter-slide synchronous, oscillatory, and radial movements of comparative velocities, the ratio of which will be such that the cutting-point of the cutter will describe a parti-helical or curvilinear line or path as it moves from the right toward the left, as shown in Fig. 14, which is substantially eccentric to the axis of movement of the carrier. In other words, on the oscillatory movement of the carrier from the right toward the left, as shown in said diagram, the path described by the cutting-point of the cutter will, owing to the conjoint radial and curvilinear movements of the cutter-slide, diverge from the right toward the left with relation to the path described by said cutter during the oscillatory movement of the carrier in the opposite direction.

By reference to the diagram Fig. 14 it will be understood that inasmuch as the cutter-slide during the oscillatory movement thereof toward the left is gradually advanced in a radial direction the line or path described by the cutter must necessarily have successive portions thereof of gradually-increased distances from the axis of oscillatory movement of the cutter-carrier, the increase in distance being dependent upon the velocity of said cutter-slide during the radial movement thereof.

The organization of mechanism herein described will cause the cutter to oscillate in paths that are relatively divergent and are substantially concentric and eccentric alternately with relation to a fixed axis. For this reason the path described by the cutter during the oscillatory movement of the carrier in one direction is for convenience termed the "concentric" path, and the path described by said cutter during the oscillatory movement of the carrier in the reverse direction is for convenience termed the "eccentric" path, as distinguishing the movements of the cutter in the present machine from the movements of cutters in gear-generating machines of known construction, and it is desired to state in this connection that by the term "eccentric," as applied to indicate the path of movement of the cutter or cutter-slide, is meant any path or line described by the cutter which is not truly concentric to the axis of movement of the cutter, let this path be parti-helical, involute, tangential, spiral, or sinuous relatively to the arc of a circle.

After the cutters have completed their working strokes the feed-wheel 39 is rotated in an opposite direction to that in which said wheel was rotated during the cutting operation and at a materially-increased velocity, and this is accomplished through the medium of the reversing driving device R, which will be hereinafter fully described, and which driving device will impart to the cutter-slide a progressive return movement, although the velocity will vary somewhat at different points in the length of the return stroke, as will be readily understood.

The reversing driving device, which also constitutes a speed-modifier, comprises, in the preferred form thereof shown most clearly in Figs. 4, 5, and 12 of the drawings, two oppositely-disposed bevel-gears 42 and 43, loosely mounted upon a shaft 44, journaled in suitable bearings on the framework of the machine and operatively connected by a train of gears (designated in a general way by T) with the feed-shaft pinion 41; a driving bevel-gear 45, meshing with the two opposing bevel-gears 42 and 43 and mounted upon a shaft 46, journaled in suitable bearings in the framework and having at the opposite end thereof a spur-wheel 47, which meshes with a pinion 48, carried upon the hub of the bevel-gear 20, which actuates the cutter-carrier-oscillating eccentric; a reversing clutch member 49, splined to a fixture on the shaft 44; a shifting device, hereinafter described, in connection with the shiftable clutch member and embodying a clutch-shifting actuator (designated in a general way by 80) which is fixed to and is controlled by the rotation of the shaft 44 for intermittently shifting the clutch member 49 into and out of engagement with one of the oppositely-disposed bevel-gears, as 43; a pinion 51, fixed to the opposite bevel-gear 42 and meshing with a spur-wheel 52, fixed to a shaft 53, journaled in suitable bearings in parallelism with the oscillating shaft 44; a pinion 54, loosely mounted upon the shaft 53 and having clutch-pins at the inner end of the hub thereof, and which pinion meshes with a spur-wheel 55, fixed to the shaft 44, and a speed-modifying clutch member 56, splined to a fixture on the shaft 53 and connected with the shifting devices in such manner as to be thrown into locked engagement with the pinion 54 when the clutch member 49 is thrown out of engagement with the gear 43, and vice versa.

Any suitable mechanism may be employed for actuating the two clutch members 49 and 56 to shift one into engagement and the other out of engagement simultaneously with their respective gears, at predetermined points in the movement of the cutter-carriers, through the medium of the feed mechanism. One form of means for accomplishing this end is shown in Figs. 4, 5, and 12 of the drawings, and comprises two parallel levers 57 and 58, pivotally supported intermediate their ends on the framework, and one of which levers is in shiftable engagement at opposite ends with the two clutch members or circumferentially-grooved clutch-sleeves 49 and and 56, respectively, and the other of which levers is connected at its lower end to the link 59, pivotally connected with a gravitated or weighted actuator-arm 60, which is pivoted at the lower end thereof to the framework, and is also shiftably connected with the lower end of the clutch-shifting lever 57 and the lever 58.

The means for actuating the lever 58 to rock the counterweighted arm 60, and thereby effect a movement of the two clutch members 49 and 56 simultaneously, is shown as a cam-wheel 50, having oppositely-disposed cam-segments 50' and 50" in position relatively to the upper free end of the lever 58, for alternately engaging and actuating the lever 58, one of said cam-segments acting to shift said lever in one direction at a predetermined point in the rotation of the shaft 44, when said shaft is rotating in one direction, and the opposite segment acting to shift said lever in the opposite direction when said shaft 44 is rotated in a reverse direction. This feed-reversing and speed-modifying mechanism may be materially modified without departure from this invention.

During the operation of the machine and during the working or cutting strokes of the cutters C and D it will be seen that the feed movement is effected through and is materially decreased in velocity, as compared with the return movement thereof, by the speed-reducing elements of the feed device, as will be understood by a comparison of Figs. 4 and 5 of the drawings, Fig. 4 showing the clutch mechanism in the position it occupies during the normal feed movement of the cutters and Fig. 5 showing the clutch members in position for throwing the speed-reducing gears out of effective operation and for imparting a relatively rapid feed movement to the cutter-slides.

By reference to Figs. 4, 5, and 12 it will be seen that motion is transmitted from the shaft 46, which is in direct connection with the main driving mechanism, through the bevel-gear 42, to the pinion 51 and the spur-wheel 52, thence through the shaft 53 to the pinion 54, thence through the spur-wheel 55 to the shaft 44, and thence to the feed-shaft 40 through the train of gears T, thus imparting a relatively slow feed movement to the cutter-slides, and it will furthermore be seen that when the clutch members are in the position shown in Fig. 5 a reversed and relatively rapid motion is imparted to the feed-shaft 40 directly through the shaft 44 and the train of gears T through the medium of the shaft 46 and the bevel-pinion meshing with the bevel-wheel 43, the speed-reducing gears 51, 52, and 54 being at this time ineffective in their operations and running loosely on their shafts.

The cam-segments 50' and 50" are so disposed on the periphery of the cam-wheel or clutch-shifting actuator 50 as to be effective for shifting the clutch members, one immediately after the cutter has completed its cutting operation and the other when said cutter has arrived approximately at the end of its return stroke. Thus it will be seen that the disposition of the cam-segments on the periphery of the clutch-shifting actuator practically determines, in connection with the associated mechanisms, the range of movement of the cutters, and also that said actuator automatically effects through the medium of the feed-reversing and speed-modifying device a relatively slow working stroke and a relatively rapid return stroke of the cutter-slides.

As a convenient means for advancing the gear-blank carrier a predetermined arc distance immediately succeeding each complete working stroke of the cutter I have provided an indexing apparatus which is controlled in its effective movements by the operation of the cutter-slide through the medium of the feed mechanism and its incorporated reversing and speed-modifying device. This indexing mechanism, in the preferred form thereof shown most clearly in Figs. 2 and 15 to 21, inclusive, comprises an index-wheel 62, having a series of peripheral index-notches and fixed to the blank-carrier spindle, a spring-propelled pin 63, normally seated in an index-notch, an oscillatory index-pin carrier 64, and an index-pin actuator or unseating device (designated in a general way by H) controlled by the movements of the cutter-carrier feed mechanism and intermittently shiftable into the path of movement of the index-pin and adapted for releasing the pin from the index-wheel, whereby on the continued movement of the oscillatory carrier said pin will engage in the next adjacent notch of the said wheel.

The index-pin carrier is shown in the drawings as a radially-disposed arm formed integral with the sector 10, which constitutes one of the actuating members for the blank-carrier and is rotatably mounted upon the sleeve in which said carrier is journaled, the index-pin and index-wheel constituting the connector between this sector and the blank-carrier. The index-pin is shown shiftable in a longitudinal recess 65, formed in the arm or carrier 64, and is held normally in locked engagement with the index-wheel by means of a spiral spring 65', said pin also being preferably furnished with a lateral projection adapted to coöperate with the pin-actuator to effect an unseating movement of the pin.

The index-pin actuator H is shown carried upon the outer end of the shaft 44 of the reversing mechanism R, and is adapted to have a rotary reciprocatory movement corresponding to the rotary reciprocatory movement of said shaft. This actuator in the preferred form thereof shown most clearly in Figs. 15 to 18, inclusive, of the drawings comprises a carrier-plate 66, having a sleeve at the inner end thereof that is fixedly mounted upon the outer end of the shaft 44 in such manner as to oscillate therewith; two relatively-separable latch members 67 and 67', pivotally supported upon the carrier-plate 66 and projecting beyond the free end of said plate, and one of said members having a cam or wedge face 67'', adapted to engage the inner face of the projection 62' on the index-pin 63, whereby to retract said pin from engagement with the index-wheel; a spring 68, engaging and normally holding the outer end of one latch member in bearing contact with the other; a stop 69' for holding one of said latch members against movement in one direction; a pivotally-supported catch 70, adapted to engage one of the latch members after the same has unseated the index-pin and for holding the two latch members with their working ends out of the path of oscillation of the index-pin carrier 64 during the first stages of the retractive movements of the carrier-plate 66; a spring 70', bearing at one end against the outer end of one of the latch members and at the opposite end against the other end of the catch, and effective for normally returning the catch to a position for engaging the latch member and for normally retaining the latch members in the position shown in Fig. 15 to intercept the index-pin when the free end of the plate comes into juxtaposition with the index-wheel, and a cam 71, projecting from a fixture of the framework of the machine into the path of movement of the inner end of the catch, said cam being shown fixed to the bearing in which the shaft 44 is journaled and being adapted for engaging and tripping the catch to release the latch members at a predetermined point in the return movement of the plate 66, and thereby allow a return of the latch members to the working positions shown in Fig. 15.

As will be seen by reference to Figs. 20 and 21 of the drawings, the carrier-plate 66 of the index-pin actuator H is furnished with a bracket 66', having a sleeve 66'', by means of which the plate is attached to the rock-shaft 44, said sleeve, bracket, and plate being preferably formed in one piece, as indicated in the figures referred to. The plate 66 has the upper face thereof inclined to correspond to the inclination of the under face of the index-pin carrier 64 relatively to the axis of the shaft 44.

In Fig. 21 of the drawings I have shown the index-pin actuator H in the position it occupies after the cutter has completed its working stroke and just preparatory to the return movement of said cutter. In this position the catch 70 has been operated by the cam 71 to release the latch members, so that they will return to a position for intercepting the index-pin when the rotation of the shaft 44 is reversed and the actuator has been carried to the position shown in Fig. 15 during the return movement of the cutter.

The index-pin actuator H, which includes the carrier-plate 66, fixed, as before described, to the shaft 44, and the devices carried by said plate, has a rotative movement first in one and then in the opposite direction with the shaft 44 as said shaft is rocked alternately in reverse directions by the reversing mechanism in connection therewith. In other words, when the shaft 44 is moving in one direction during the effective or cutting stroke of the cutters the index-pin actuator moves backward with said shaft from the position thereof shown in Fig. 17 to that shown in Fig. 21 of the drawings, and on the reverse movement of said shaft said index-pin actuator is carried forward with said shaft to the position shown in Fig. 15. This mechanism is so organized and timed in its movements that the index-pin actuator will during the working stroke of the cutter move backward away from its index-pin-intercepting position and will during the return stroke of said cutter move forward toward said index-pin, and will at the end of this forward movement retract the index-pin and permit the indexing of the blank, which indexing of the blank takes place at the end of each return stroke of the cutter.

In the organization of indexing mechanism described the index-pin actuator is moved toward the pin-actuating position (shown in Fig. 15) during the return stroke of the cutters and is so timed in its movements that the cam-face 67'', which is in the nature of a projection on the index-pin-actuating latch member 67', as shown most clearly in Fig. 18, will intercept the path of movement of the projection 62' on and shift the index-pin out of the index-notch substantially at the same moment that the cutters arrive at the end of their return strokes. As the projection 62' on the index-pin rides up the cam-face 67'' of the latch member 67 through the oscillatory movement of the index-pin carrier 64, as illustrated in Figs. 15 to 17, inclusive, of the drawings, said projection 62' is carried forward between the two latch members, as shown in Fig. 16, until the same arrives at the end of the cam-face 67'', when it will be forced over the inner end of the cam and the index-pin will be projected forward by means of a spring 68 into the notch next adjacent the one from which it was released, the spreading of the two latch members carrying the rear end of one of said latch members into locked engagement with the catch 70, which holds the same in the position shown in Fig. 17 until the index-pin is seated and the actuating device H has been carried back by the reverse movement of the shaft 44 sufficiently to bring the free end of the catch into position to be actuated by the cam 71, which releases the catch and allows the latch members to return to their normal operative positions, this releasing of the catch taking place during the working stroke of the cutters.

It is desired to state in the above connection that while it is preferable to employ an index-pin actuator such as shown in the accompanying drawings and hereinbefore described I do not desire to limit myself to any particular construction or organization of means for retracting or unseating the index-pin, as any form of index-carrier controlled by the movements of the cutter-carrier feed mechanism is within the scope and limits of my present invention.

By the term "oscillatory movement," as employed in connection with the gear-blank carrier, is meant a rotary reciprocatory movement of said carrier about its own axis.

The operation of generating a bevel-gear tooth by my machine is as follows: Upon the inauguration of the movements of the several mechanisms the blank G, together with the cutters C and D, will be oscillated or reciprocated rotatively and in synchronism in substantially corresponding directions, but in intersecting planes, and usually at relatively-varying velocities, and at each cutting stroke of the cutter-carrier the cutters will receive an advancing impulse in a plane transverse to the axis of the blank-carrier and toward the geometrical apex of the gear-blank, which is designated by G', Fig. 13. The cutters, owing to their oscillatory movements and intermittent working strokes, will describe a sinuous path in the cutting operations, which path of movement of the cutters is represented by the sinuous or zigzag line $p$ in Fig. 14 of the drawings, which figure is a diagrammatic view illustrating the sinuous cutting movement of the cutters and clearly shows the gradual decrease in the throw or oscillatory range of the cutters as they advance toward the geometrical apex of the gear-blank. During the cutting strokes of the cutters the said cutters and gear-blank have a rolling action relatively to one another corresponding to the rolling action of two intermeshing gears. Thus it will be seen that, contrary to the usual method of cutting a tooth-face by successive operations, the tooth-face is generated by a continuous movement of the cutter in a sinuous path, the oscillations of the cutter and the change in the angular positions of said cutter relatively to the tooth being generated forming a theoretically-correct curve for the working face of the tooth.

When the cutters have arrived at the end of their working strokes, a relatively rapid return stroke is imparted thereto through the medium of the reversing and speed-modifying device and the clutch-shifting member 50 in connection therewith, and at the same time the index-pin actuator H is brought into engagement with and unseats the index-pin from the index-wheel 62 and effects, through the medium of the pin-carrier, a reëngagement of said pin with the next adjacent index-notch of the index-wheel. Thus it will be seen that all of the operations of the machine are automatically effected.

The reversing and speed-modifying device, it will be seen, is intermittently operative for alternately imparting a relatively slow feed stroke and a relatively rapid return stroke to the cutter-slides, the intermittent operation of this device practically governing the intermittent working strokes and velocities of the cutters.

Having described my invention, I claim—

1. The combination, with a cutter-slide, of means for imparting to said slide oscillatory movements alternately concentric and eccentric relatively to a fixed axis.

2. The combination, with a carrier, of a cutter-slide mounted thereon; and means for imparting to said slide, through the medium of the carrier, oscillatory movements in paths alternately concentric and eccentric relatively to the carrier-axis.

3. The combination, with a carrier, of a cutter-slide mounted on said carrier; means for imparting oscillatory movements to said carrier; and means for advancing the slide concurrently with, and throughout the entire length of, alternate movements of the carrier.

4. In a machine for generating gear-teeth, the combination, with a cutter-carrier supported for oscillatory movements, of a cutter shiftably mounted on the carrier; and coöperatively-connected mechanisms for imparting curvilinear strokes to the carrier in alternately-opposite directions and for progressively advancing the cutter simultaneously with, and throughout the entire length of, alternating strokes of said carrier and in a plane intersecting the oscillatory path thereof, and for also imparting a quick return movement to said cutter after the same has arrived at a predetermined advanced position.

5. In a machine for generating gear-teeth, in combination, a gear-blank carrier; a cutter-carrier; means for synchronously imparting rotary reciprocatory movements to the gear-blank carrier and oscillatory movements to the cutter-carrier; and feed mechanism comprehending means for imparting a slow progressively-advancing movement to the cutter-carrier in a plane intersecting the oscillatory path thereof simultaneously with, and throughout the entire length of, alternate oscillatory movements of said carrier, whereby said cutter-carrier will have an oscillatory movement in one direction in a line or path concentric to a fixed axis and will have an oscillatory movement in an opposite direction in a line or path eccentric to said axis.

6. In a machine for generating gear-teeth, the combination, with a gear-blank carrier and a cutter-carrier and with means for simultaneously imparting to each carrier oscillatory strokes in alternately-opposite directions, of rotary feed mechanism automatically operable in synchronism with and throughout each alternating stroke of the cutter-carrier for imparting, during and throughout said stroke, a slow advancing or feed movement to said cutter-carrier, and automatically operable at a predetermined point in the advancing movement of said carrier for imparting a quick return movement thereto, which advancing and return movements are in a plane intersecting the curvilinear path of movement of said carrier.

7. In a machine for generating gear-teeth, the combination, with a gear-blank carrier, of an oscillatory carrier; a cutter-slide mounted on said carrier for movements in a plane intersecting the oscillatory path thereof; means for imparting to said carrier oscillatory strokes in alternately-opposite directions; and feed mechanism in operative connection with the carrier and cutter-slide and effective, through each alternating oscillatory stroke of the carrier, for progressively advancing the cutter-slide in a plane intersecting the oscillatory path of the carrier, and embodying reversing mechanism automatically effective at a predetermined point in the advancing movement of the cutter-slide for imparting a quick return movement thereto.

8. In a machine for generating gear-teeth the combination, with a cutter-carrier supported for curvilinear and radial movements in intersecting planes and with mechanism for imparting curvilinear movements to said carrier, of feed mechanism in operative connection with said carrier and effective for imparting relatively slow advancing and a relatively rapid retractive movement to said carrier during the curvilinear movement thereof; a rotary reciprocatory blank-carrier coöperatively connected with the cutter-carrier, for movements in synchronism therewith; and indexing mechanism controlled by the movements of the cutter-carrier, for indexing the blank carried by the blank-carrier.

9. In a machine for generating gear-teeth, the combination, with an oscillatory gear-blank carrier and an oscillatory cutter-carrier and with actuating mechanism for synchronously oscillating the gear-blank carrier and cutter-carrier, of a cutter-slide mounted on the cutter-carrier for reciprocatory movements in a plane intersecting the oscillatory path of said carrier; and continuously-rotating mechanism for imparting alternately slow and rapid working and return strokes, respectively, to said cutter-slide during and without interrupting the oscillatory movement of said cutter carrier and slide.

10. In a machine for generating gear-teeth, the combination, with a gear-blank carrier and a cutter-carrier, of a cutter-slide mounted on the carrier for reciprocatory movements in a plane intersecting the oscillatory path of said carrier; means for simultaneously imparting oscillatory strokes to the gear-blank carrier and cutter-carrier; and feed mechanism continuously driven from the aforesaid means and effective for imparting to the cutter-slide alternately slow and rapid working and return strokes, respectively, during and without interrupting the oscillatory movement of the cutter-carrier and cutter-slide.

11. In a machine for generating gear-teeth, the combination, with a gear-blank carrier and a cutter-carrier, of a cutter-slide mounted on the carrier for reciprocatory movements in a plane intersecting the oscillatory path of said carrier; means for simultaneously imparting oscillatory strokes to the gear-blank carrier and cutter-carrier; feed mechanism continuously driven from the aforesaid means and effective for imparting to the cutter-slide alternately slow and rapid working and return strokes, respectively, during and without interrupting the oscillatory movement of the cutter-carrier and cutter-slide; and indexing mechanism in operative connection with said means and controlled by the cutter-carrier for intermittently advancing the gear-blank carrier a predetermined arc distance between the return and working strokes of the cutter-slide.

12. In a machine for generating gear-teeth, a cutter-slide carrier supported for oscillatory movements; combined with a cutter-slide supported on said carrier, for movement in a plane intersecting the oscillatory path of the carrier; a feed-wheel having its axis coincident with the axis of oscillatory movement of the cutter-slide carrier; a feed-screw in connection with the cutter-slide and having a gear in connection with the feed-wheel; means for oscillating the cutter-slide carrier; and means for rotating the feed-wheel simultaneously with the oscillatory movement of the cutter-slide carrier, to thereby impart a feed movement to said slide.

13. In a machine for generating gear-teeth the combination, with a cutter-slide carrier supported for oscillatory movement and with a cutter-slide supported on said carrier, for reciprocatory movement; of coöperative mechanisms for simultaneously actuating the cutter slide carrier and slide and embodying a feed-wheel having its axis coincident with the axis of oscillation of the slide-carrier; and an actuating-connector between the cutter-slide and feed-wheel.

14. In a machine for generating gear-teeth the combination, with a cutter-slide carrier supported for oscillatory movement and with mechanism for oscillating said carrier; of a cutter-slide mounted on said carrier, for reciprocatory movements in a plane intersecting the oscillatory path of the slide-carrier; a feed-wheel rotatively supported with its axis coincident with the axis of oscillation of the slide-carrier; a feed-screw in connection with the actuator-slide; and an intermediate wheel carried on the feed-screw and meshing with the feed-wheel and adapted upon the oscillation of said slide-carrier to have a parti-orbital movement about the axis of, and with, said feed-wheel, whereby an intermittent feed movement is imparted to the cutter-slide during the rotation of the feed-wheel and the oscillation of the slide-carrier.

15. In a machine for generating gear-teeth the combination, with a suitable frame, of a cutter-slide carrier having a sleeve journaled for oscillatory movement in said frame; mechanism for oscillating said slide-carrier;

a cutter-slide mounted in ways upon the slide-carrier, for reciprocatory movement in a plane intersecting the oscillatory path of the slide-carrier; a feed-shaft journaled in the sleeve of the slide-carrier, with its axis coincident with the axis of movement of the slide-carrier; a feed-screw supported in the slide-carrier and having a screw-threaded bearing in the cutter-slide; a gear carried by the feed-screw in mesh with the feed-wheel; and means for rotating the feed-shaft, to thereby intermittently impart a feed movement to the cutter-slide during the oscillation of the slide-carrier.

16. In a machine of the class specified, the combination, with a gear-blank carrier and with mechanism for oscillating the same, of a cutter supported for differential movements; and mechanism embodying means for imparting oscillatory advancing movements to the cutter in paths alternately concentric and eccentric with relation to a fixed axis, and also embodying means for retracting the cutter by a relatively rapid movement.

17. In a machine of the class specified, the combination, with a gear-blank carrier, of a cutter-carrier supported for oscillatory movements; a cutter mounted on said carrier; means for rotating the cutter; and mechanism connecting the gear-blank carrier and cutter-carrier and adapted for imparting oscillatory movements to the gear-blank carrier and for simultaneously imparting to the cutter, through the medium of its carrier, oscillatory advancing movements in paths that are alternately concentric and eccentric with relation to a fixed axis, and which mechanism also embodies means for imparting relatively accelerated retractive movements to said cutter.

18. The combination, with an oscillatory cutter-slide carrier and with a cutter-slide supported on said carrier for reciprocatory movements in a plane intersecting the oscillatory path of said carrier, of a feed-shaft journaled in the carrier; a feed-screw rotatably supported on the carrier at one side the axis thereof and having a screw-threaded bearing in the cutter-slide; a pair of intermeshing spiral gears one of which is carried by the feed-shaft and the other of which is carried by the feed-screw; and means for rotating the feed-shaft.

19. The combination, with an oscillatory cutter-carrier and with two cutter-slides supported one at each side the axis of said carrier, for reciprocatory movements in planes intersecting the oscillatory path of said carrier, of two feed-screws supported on the carrier and each having a bearing in one of said slides; a feed-wheel supported for rotative movement between the two feed-screws, with its axis coincident with the axis of oscillatory movement of the carrier; two feed-transmitting gears carried by the feed-screws and meshing, respectively, with opposite sides of the feed-wheel; actuating mechanism for operating the carriers and for rotating the feed-wheel in concentric paths at such relative velocities as will cause the feed-wheel to have an effective feed movement when the carrier and feed-wheel are moving in opposite directions and will cause the same to have an ineffective movement when the carrier and feed-wheel are moving in the same direction; and means for reversing the normal direction of rotation of the feed-wheel, to impart a quick return movement to the cutter-slide.

20. In a machine for generating gear-teeth, the combination, with a cutter-carrier and a gear-blank carrier connected to have curvilinear movements each in alternately-opposite directions and in unison and with actuating mechanism therefor, of a cutter-slide mounted on the cutter-carrier for reciprocatory movements in a plane intersecting the oscillatory path of said carrier; and rotary feed mechanism constantly driven by the carrier-actuating mechanism and adapted for imparting a progressively-advancing movement to the cutter-slide during and throughout alternating oscillatory movements of the cutter-carrier, and embodying automatically-operable reversing and speed-modifying means effective, at a predetermined point in the advancing movement of the cutter-slide, for imparting a relatively rapid return movement to the cutter-slide.

21. In a machine for generating gear-teeth, the combination, with a cutter-carrier and a gear-blank carrier connected to have curvilinear movements each in alternately opposite directions and in unison and with actuating mechanism therefor, of a cutter-slide mounted on the cutter-carrier for reciprocatory movements in a plane intersecting the oscillatory path of said carrier; rotary feed mechanism constantly driven by the carrier-actuating mechanism and adapted for imparting a progressively-advancing movement to the cutter-slide during and throughout alternating oscillatory movements of the cutter-carrier, and embodying automatically-operable reversing and speed-modifying means effective, at a predetermined point in the advancing movement of the cutter-slide, for imparting a relatively rapid return movement to the cutter-slide; and indexing mechanism in connection with the gear-blank carrier and the cutter-carrier feed mechanism, and controlled by said feed mechanism, at a predetermined point in the cutter-slide-retracting movement thereof, for advancing the gear-blank carrier a predetermined arc distance.

22. The combination, with an oscillatory cutter-slide carrier and with a cutter-slide supported on said carrier, for reciprocatory movements in a plane intersecting the oscillatory path of said carrier; of a feed-screw journaled in the carrier at one side the axis thereof and having a screw-threaded bearing in the cutter-slide; a feed-shaft having its axis coincident with the axis of the carrier; two intermeshing spiral wheels connecting the feed-screw and feed-shaft; oscillating mechanism for the cutter-slide carrier; and a reversing driving device in geared connection with the feed-shaft and carrier-oscillating mechanism and embodying instrumentalities for intermittently and automatically reversing the direction of rotation of the feed-shaft, to impart working and return strokes, alternately, to the cutter-slide and also embodying speed-modifying instrumentalities controlled by the reversing instrumentalities of the driving device and effective for accelerating the rotation of the feed-shaft, to thereby accelerate the return stroke of the cutter-slide.

23. In a machine for generating gear-teeth the combination, with a cutter-carrier supported for oscillatory and reciprocatory movements in relatively-intersecting planes, of actuating mechanism for continuously oscillating said cutter-carrier; rotative feed mechanism in geared connection with the cutter-carrier and actuating mechanism and comprising two oppositely-rotating gears loosely mounted upon a shaft in geared connection with the cutter-carrier; a clutch member carried on said shaft and shiftable into and out of locked engagement with one of the reversing-gears; a speed-reducing train connecting the other gear to said shaft; a clutch-shifter for alternately effecting a reversal in the direction of rotation of the shaft and for intermittently effecting a change in the velocity of said shaft; and a clutch-shifter actuator carried on said shaft and intermittently effective for shifting the clutch into and out of locked engagement with the reversing-gear.

24. In a machine of the class specified, the combination, with an oscillatory cutter-carrier and with mechanism for imparting oscillatory movements to said carrier, of a cutter-slide mounted on said carrier for reciprocatory movements in a plane intersecting the oscillatory path thereof; and continuously-rotative feed mechanism in connection with the carrier and the carrier-actuating mechanism and embodying automatically-operable reversing and speed-modifying devices effective, at a predetermined point in the advancing movement of the cutter-slide, for reversing the direction of rotation and for accelerating the velocity of the feed mechanism.

25. In a machine of the class specified, the combination, with an oscillatory cutter-carrier and with mechanism for imparting oscillatory movements to said carrier, of a cutter-slide mounted on said carrier for reciprocatory movements in a plane intersecting the oscillatory path thereof; continuously-rotative feed mechanism in connection with the carrier and the carrier-actuating mechanism and embodying automatically-operable reversing and speed-modifying devices effective, at a predetermined point in the advancing movement of the cutter-slide, for reversing the direction of rotation and for accelerating the velocity of the feed mechanism; a gear-blank carrier; and means controlled by the feed-reversing device for intermittently advancing said carrier a predetermined arc distance.

26. The combination, with a cutter-slide supported for differential movements and with an oscillatory gear-blank carrier, of means connecting the cutter-slide and gear-blank carrier and effective for imparting to said cutter-slide oscillatory movements in paths that are alternately concentric and eccentric with relation to a fixed axis and for synchronously oscillating the gear-blank carrier; and an indexing mechanism controlled by the slide-actuating means, for intermittently advancing the blank-carrier a predetermined arc distance at predetermined points in a movement of the cutter-slide.

27. In a machine of the class specified, the combination, with an oscillatory cutter-carrier and with an oscillatory gear-blank carrier and means for synchronously oscillating the cutter-carrier and gear-blank carrier, of a cutter-slide mounted on the cutter-carrier for reciprocatory movements in a plane intersecting the oscillatory path of said cutter-carrier; continuously-rotating mechanism automatically operable for intermittently imparting advancing movements to the cutter-slide; an indexing-wheel carried by the blank-carrier; and means actuated by the cutter-carrier-actuating means, for intermittently and automatically advancing the blank-carrier a predetermined arc distance.

28. In a machine of the class specified the combination, with a cutter-carrier and gear-blank carrier and with means for imparting synchronous oscillatory movements to said carriers in relatively transverse planes, of rotative feed mechanism for imparting working and return strokes, alternately, to the cutter-carrier in a plane intersecting the oscillatory path of said carrier and embodying means for accelerating the return stroke thereof; and indexing mechanism in connection with the blank-carrier and automatically controlled by the movements of the feed mechanism, for intermittently advancing said blank-carrier a predetermined arc distance.

29. In a machine of the class specified the combination, with a cutter-carrier and a gear-blank carrier and with means for synchronously actuating the two carriers in relatively transverse planes; rotative feed mechanism embodying a feed-shaft in connection with the cutter-carrier and also embodying a reversing driving device in geared connection with the feed-shaft; and carrier-oscillating mechanism intermittently and automatically effective for reversing the rotation of the feed-shaft; an index-wheel carried by the blank-carrier; and means controlled by the movements of the reversing device, for intermittently and automatically advancing the gear-blank carrier a predetermined arc distance.

30. In a machine of the class specified the combination, with a cutter-carrier and with actuating mechanism for imparting working and return strokes, alternately, to said carrier, of a gear-blank carrier; an index-wheel carried by the gear-blank carrier; an oscillatory index-pin carrier; an index-pin in normal engagement with the index-wheel; means controlled by the cutter-carrier-actuating mechanism, for intermittently releasing the index-pin from locked engagement with the index-wheel; and means for oscillating the index-pin carrier, to effect a reëngagement of said pin with said index-wheel at a different point in the perimeter of said wheel.

31. In a machine of the class specified the combination, with a gear-blank carrier and a cutter-carrier and with actuating mechanism for simultaneously oscillating said carriers in relatively transverse planes, of a peripherally-notched index-wheel fixed to the blank-carrier; an index-pin in normal locked engagement with the index-wheel; and an oscillatory pin-actuator controlled by the movements of the cutter-carrier-actuating mechanism, for intermittently unseating the pin to facilitate a reëngagement of said pin with the next adjacent peripheral notch of the index-wheel during the continued movement of the blank-carrier oscillator.

32. In a machine of the class specified the combination, with a cutter-carrier and with actuating mechanism embodying means for imparting reverse movements of relatively varying velocities to said cutter-carrier, of a gear-blank carrier; an index-wheel fixed to the gear-blank carrier; an oscillatory index-pin carrier in operative connection with the cutter-carrier-actuating mechanism and actuated thereby and having an index-pin in normal locked engagement with the index-wheel; and an index-pin actuator controlled by the movements of the cutter-carrier-actuating mechanism and adapted, at predetermined points in the movements of the cutter-carrier, for engaging and unseating the index-pin, whereby on the continued movement of the actuating mechanism said pin is reengaged with the index-wheel at a different point in the circumference thereof.

33. In a machine of the class specified the combination, with a gear-blank carrier supported for oscillatory movements, of a peripherally-notched index-wheel fixed to said carrier; an oscillatory index-wheel actuator; a pin shiftably carried by said actuator and normally seated in one of the notches of the index-wheel, whereby it constitutes a connector between the actuator and blank-carrier; an index-pin actuator supported for movement toward and away from the index-pin and embodying a latch for unseating said index-pin; actuating mechanism for continuously oscillating the index-wheel actuator; and means controlled by the movements of said actuating mechanism, for interposing the pin-actuating latch in the path of movement of the pin, to thereby effect a retractive movement of said pin during the oscillatory movement of the index-wheel actuator and facilitate a reëngagement of said pin with the next adjacent notch of the index-wheel.

34. In a machine for generating gear-teeth, the combination, with a cutter-carrier and a gear-blank carrier, of means for synchronously oscillating said carriers; and means operable on one stroke of the cutter-carrier for automatically indexing said gear-blank carrier.

35. The combination, with a carrier, of two cutter-slides mounted on said carrier; means for imparting oscillatory strokes to said carrier; and means for advancing the slides in relatively oblique lines concurrently with and throughout oscillatory strokes of said carrier.

HERBERT C. WARREN.

Witnesses:
EMORY C. WHITNEY,
WM. H. BLODGETT.